US005639336A

United States Patent [19]

Hsu

[11] Patent Number: 5,639,336

[45] Date of Patent: Jun. 17, 1997

[54] FIXTURE FOR ADHERING A LABEL ONTO A SURFACE OF AN OBJECT

[75] Inventor: Hung Huan Hsu, Kweishan, Taiwan

[73] Assignee: Acer Peripherals, Inc., Taoyuan, Taiwan

[21] Appl. No.: 332,018

[22] Filed: Oct. 31, 1994

Related U.S. Application Data

[62] Division of Ser. No. 118,708, Sep. 9, 1993, Pat. No. 5,411,620.

[51] Int. Cl.[6] .......... B32B 31/00

[52] U.S. Cl. .......... 156/391; 156/573; 156/579; 269/47; 269/54

[58] Field of Search .......... 156/573, 579, 156/391, 230, 297, 299, 344, 303.1; 269/53, 54, 54.4, 47, 43

[56] References Cited

U.S. PATENT DOCUMENTS

| | | | |
|---|---|---|---|
| 707,781 | 8/1902 | Howard | 156/573 |
| 710,867 | 10/1902 | Howard | 156/573 |
| 1,467,971 | 9/1923 | Wyman | 269/47 |
| 1,543,901 | 6/1925 | Bicknell | 156/573 |
| 2,486,040 | 10/1949 | Laube et al. | 269/47 |
| 2,969,106 | 1/1961 | Reibel et al. . | |
| 3,536,555 | 10/1970 | Thompson, Jr. | 269/53 |
| 3,679,198 | 7/1972 | Weggeland . | |
| 4,818,329 | 4/1989 | Tutas et al. | 156/391 |
| 5,316,613 | 5/1994 | Samuelson et al. | 156/540 |
| 5,318,659 | 6/1994 | Manico et al. | 156/538 |

*Primary Examiner*—David A. Simmons
*Assistant Examiner*—Paul M. Rivard

[57] ABSTRACT

A method and fixture for adhering a label onto a surface of an object. The fixture is a sheet body and has a hollow space in its central area for receiving the label to be adhered. The sheet body has at least a positioning structure for being accurately positioned on the nearby area of the location where the label to be adhered.

1 Claim, 4 Drawing Sheets

FIXTURE FOR ADHERING A LABEL ONTO A SURFACE OF AN OBJECT

This is a divisional of application Ser. No. 08/118,708 filed on Sep. 9, 1993, now U.S. Pat. No. 5,411,620.

TECHNICAL FIELD OF THE INVENTION

The invention relates in general to a fixture and method for adhering a label onto a surface of an object and, in particular, relates to a fixture and method for adhering a label onto a surface of an electronic apparatus such as a monitor, a terminal or computer.

BACKGROUND OF THE INVENTION

Products sold in the market generally have a label, such as a trademark or a logo, adhered on their surfaces. If the products are sold by a manufacturer under the manufacturer's own brand, then a label is adhered on the surface of the product at the final stage of assembly and the finished product is packed and placed into a carton for shipment.

In some transactions, such as in an Original Equipment Manufacture (OEM) arrangement, products are shipped without any label. Instead, a label (typically containing the purchaser's own brand) is adhered onto a surface of the product by the purchaser. The reason for this process is because the purchaser of the product can sometimes make more profit selling the product under its more well-known brand and through its marketing channels. Many sales and trading companies have been doing business in this way for many years.

Some products, such as monitors, terminals, or computers with high precision mechanical and/or electrical parts, must be carefully packed to avoid damage due to shipment. If the product received by the purchaser has no label and the purchaser intends to adhere its own label onto the product, the carton must first be unpacked and the product must then be taken out for adhesion of the label according to the conventional approach. At the completion of the above process, the product with label must then be placed in the carton and packed carefully again for further shipment to the downstream purchasers. The above process involves an unpacking and another packing procedure and it is time consuming and needs substantial human involvement. Furthermore, when the worker adheres the label onto the surface of the goods, the label might be positioned inaccurately and which results in a misalignment of the label with respect to the product. That kind of defect might be a major concern to some critical consumers.

SUMMARY OF THE INVENTION

To the shortcomings of the conventional approach recited above, the present invention provides a fixture and method for adhering a label onto a surface of the goods. The invention allows the purchaser of the goods to adhere the label onto the precise location of the goods which improves the efficiency of the task and therefore reduces substantially the cost involved in the label adhesion process.

The fixture of the invention is a sheet body and has a hollow space on its central area for receiving the label to be adhered. The sheet body has at least a positioning structure for being accurately positioned on the nearby area of the location where the label is to be adhered.

The utility and characteristic of the invention may be further understood with the following recitation on the invention accompanied by the appended drawings.

DETAILED DESCRIPTION OF THE PRESENT INVENTION

Figure 1B:
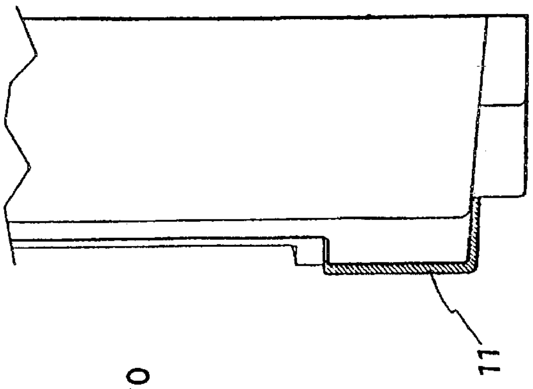
FIG. 1 shows a front view of a fixture, according to the invention, and the front view and the side view of the assembly when the fixture is positioned and engaged with a structure of a monitor.
Figure 1A:
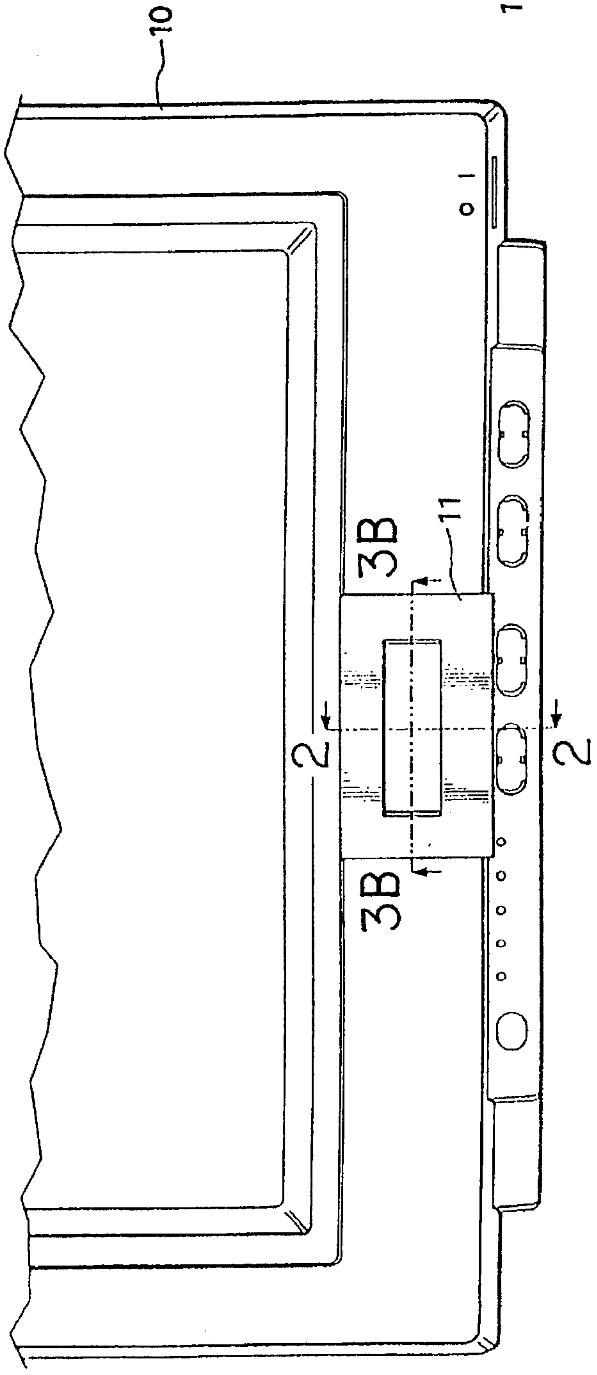
Figure 2:
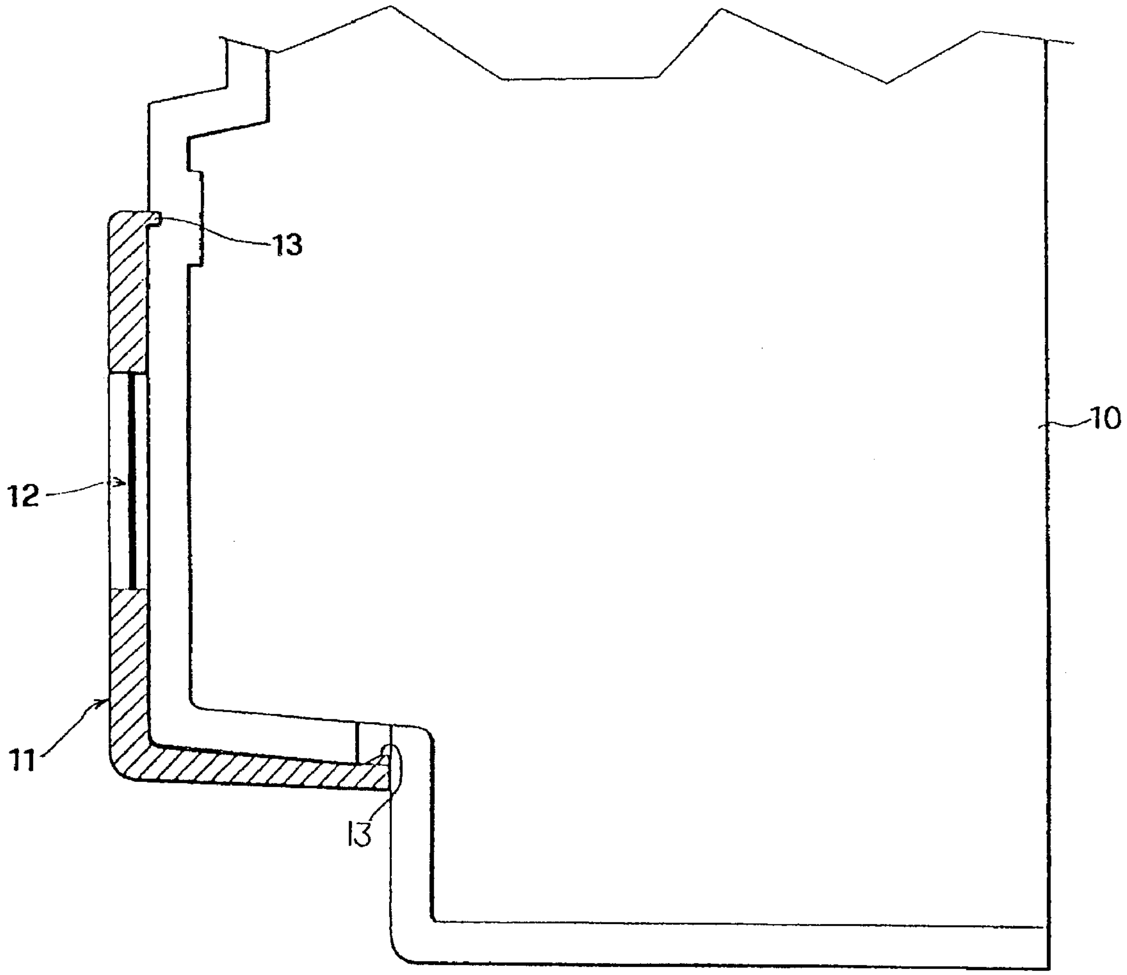
FIG. 2 shows the view of the section 2—2 in FIG. 1.

As shown in FIG. 1 and FIG. 2, the fixture 11 of the invention is a sheet body and has a hollow space substantially on its central area for receiving a label 12 to be adhered. The sheet body has at least a positioning structure 13 for accurately being positioned on a nearby area of the location where the label is to be adhered.

The shape of the hollow space may be rectangular, as shown in FIG. 1, or another kind of shape, such as an ellipse, depending on the shape of the label to be adhered.

Figure 3A:
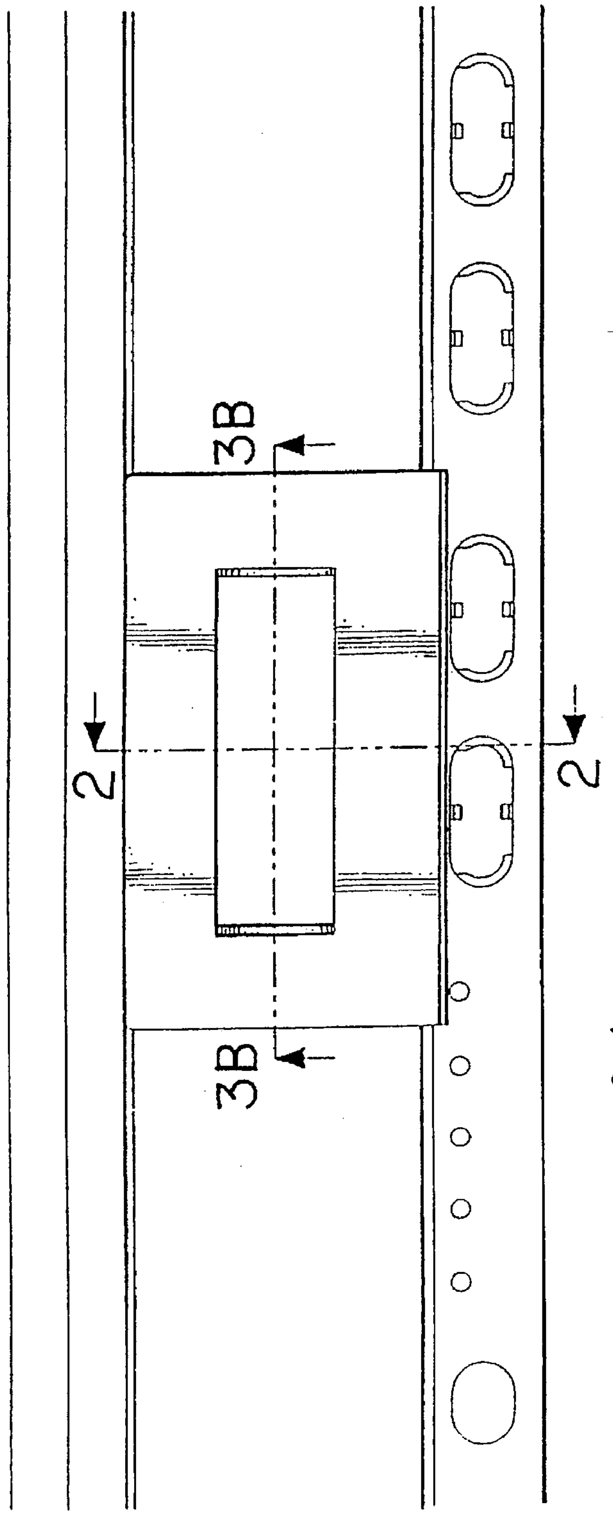
FIG. 3 shows the enlargement view of FIG. 1 and the view of the section 3B—3B of FIG. 1
Figure 3B:
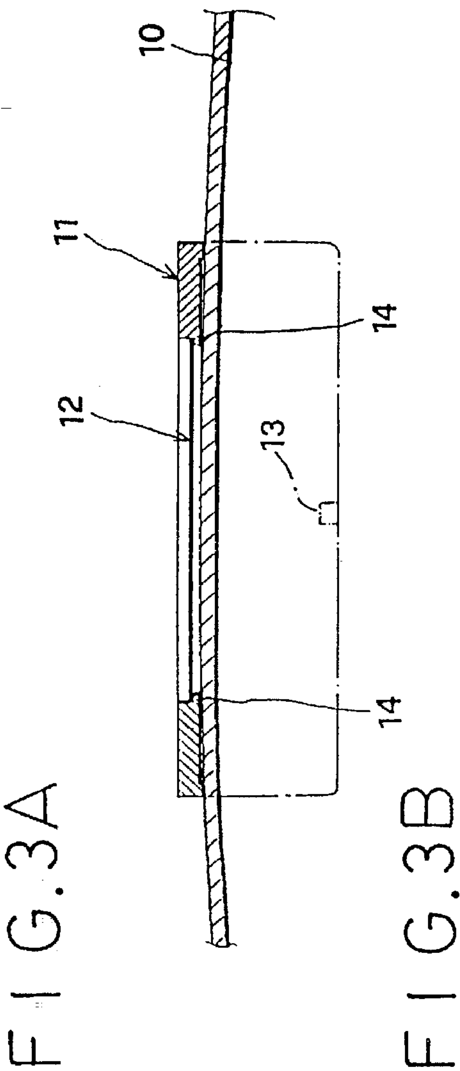

Referring to FIG. 2 and FIG. 3 which have the views of the section 2—2 and 3B—3B of FIG. 1, the positioning structure 13 is a convex point for engaging with a corresponding cavity of the monitor 10.

However, where the positioning structure 13 is a rib, then a corresponding slot is required on the monitor 10 for the engagement with the rib.

Accordingly, the positioning structure 13 may be a cavity or a slot, and a convex point or a rib is then required on the monitor 10 respectively for the engagement with the other.

Referring to FIG. 1 and FIG. 3, the fixture 11 has an inner rim formed on the circumference of the hollow space at least a rib 14 is extending from the inner rim for supporting and positioning the label 12 placed inside the hollow space.

A procedure is disclosed in the following for adhering the label 12 to the surface of an object.

At first, place the label 12 into the hollow space of the fixture 11. Then position the fixture 11 with use of the positioning structure of the surface of the object 10 as shown in FIGS. 2 and 3. Afterwards, press the label 12 toward the surface of the object 10 such that the rear surface of the label 12, which has a glue material, is adhered on the surface of the object 10. The next step is to remove the fixture 11 from the positioning structure of the surface of the object 10 and the label 12 is therefore detached naturally from the fixture 11. The label 12 is as expected adhered to the surface of the object 10.

Figure 4:
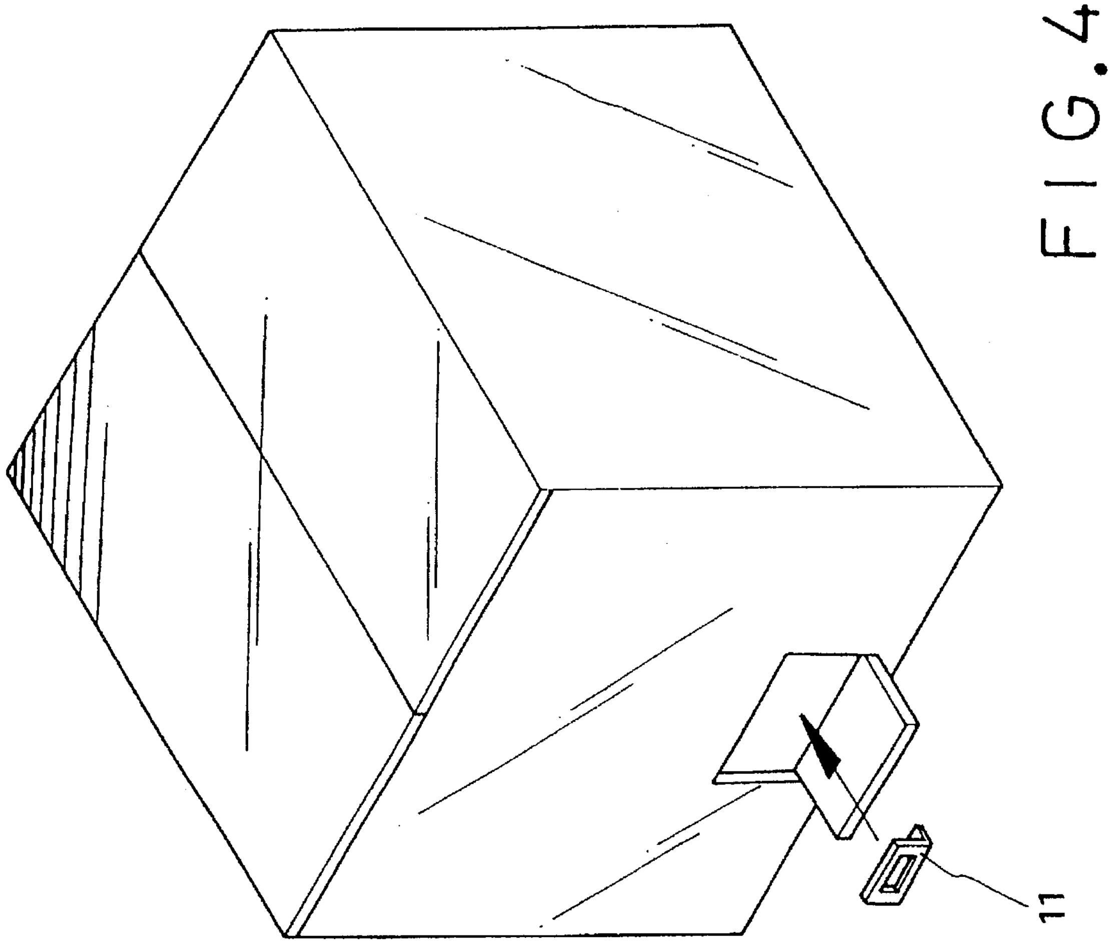
FIG. 4 shows the adhering procedure when the product is placed in a carton.

If the monitor 10 is placed and packed in a carton, as shown in FIG. 4, a movable window corresponding to the location of the positioning structure must be provided on the surface of the carton. The adhering procedures are as follow.

At first, place the label 12 into the hollow space of the fixture 11. Then open the window of the carton, and place the fixture 11 into the inside of the carton. At the same time position the fixture 11 with use of the positioning structure of the surface of the object 10. Afterwards, press the label 12 toward the surface of the object 10 such that the rear surface of the label 12, which has a glue material, is adhered on the surface of the object 10. The next step is to remove the fixture 11 from the positioning structure of the surface of the object 10 and take the fixture 11 out of the carton. The label 12 is therefore detached naturally from the fixture 11 and is as expected adhered to the surface of the object 10.

The monitor 10 has been used in the detailed description of the invention recited above for illustrative, rather than limiting, purposes. Therefore, the principle underlying the invention is applicable to any object which is adhereable, for example, a terminal, a computer, audio or other video equipment. Not only the above preferred embodiment of the invention, but the equivalents thereof, is the intended scope of the protection of the invention which is defined by the following claims.

What is claimed is:

1. An article of manufacture comprising:

(1) a video display device having a surface and a location on the surface for placement of a label by way of a fixture;

(2) a container containing the video display device, the container having a non-openable wall structure for covering said location on the surface of the video display device;

(3) an opening in said wall structure which, when uncovered, exposes said location; and (4) a first positioning structure provided on said surface and adjacent said location for receiving a counterpart second positioning structure of the fixture while the fixture holds the label, the fixture for placement of said label onto said location.

* * * * *